Patented Feb. 17, 1931

1,793,312

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

SYNTHETIC RESIN AND PROCESS OF MAKING SAME

No Drawing.   Application filed October 23, 1924. Serial No. 745,383.

This invention relates to synthetic resins and plastic materials made therefrom and to the process of making same and relates especially to a product of the reaction of formaldehyde or other appropriate aldehyde on a non-corrosive compound or material derived by treating a corrosive carbolic acid or other similar phenolic acid substance with benzotrichloride or side-chain chlorinated toluol, xylol and the like, preferably in the presence of an auxiliary agent such as alcohol.

As is well known formaldehyde is an active resinifying agent being capable of reacting with a great variety of highly dissimilar substances to form resins. For example it reacts with acetone in the presence of alkaline substances to form resins which under certain conditions have the property of quickly becoming hard and infusible on heating. In like manner urea and formaldehyde combine to give resins that undergo changes on heating resulting in infusible or heat-resistant products. A third type of resin is that obtained by the action of formaldehyde on phenol or cresol, yielding resins which likewise when prepared under appropriate conditions will readily harden on the application of heat. A number of these resins have found commercial application in the plastic molding field because of their property of setting or becoming thermo-rigid when hot pressed.

The phenol-formaldehyde resins have been widely used in this manner. An objection to these products is their generally phenolic character involving the danger of free phenol, that is, carbolic acid, being present in the mixture used for molding purposes and causing erythrema or other skin disturbances.

Phenol and cresol, commonly known as carbolic acid and cresylic acid respectively, are very corrosive acid substances producing violent burns in contact with the human body and exerting a poisonous action by absorption through the skin. Even carbolic acid ointment containing only 2 or 3 per cent of phenol has caused gangrene and fatal poisoning by such absorption.

According to the present invention it is an object to produce a compound of novel properties by combining benzotrichloride or side-chain chlorinated toluol with for example phenol or cresol, preferably in the presence of an auxiliary substance such as an alcohol, ethyl alcohol, for example, being suitable. By such procedure the caustic properties of phenol are destroyed and there is obtained a substance which is of a more neutral character resembling in this respect, for example, acetone or urea and which new substance is capable like the latter of reacting with formaldehyde to produce useful resinous substances.

The reaction between ordinary carbolic acid or phenol and benzotrichloride (both of which substances are highly corrosive) is a very violent one and if the two are mixed and heated to start the reaction conversion to a non-corrosive substance takes place so vigorously, with evolution of hydrochloric acid, that great difficulty is experienced in carrying such a reaction through uniformly. The presence of an alcohol such as ethyl alcohol reduces the violence of the reaction to some extent but even with an auxiliary substance of this character there would be difficulty in operating on the large scale.

In accordance with the preferred form of my invention the difficulties due to violent reaction mentioned above may be overcome by allowing the raw materials to react together in the cold. If for example a mixture in the proportion of 1 mol. (195 parts) of benzotrichloride, or a corresponding amount of impure side-chain-chlorinated toluol, to approximately 3 mols. (282 parts) of carbolic acid (phenol) and 1 mol. of ethyl alcohol is allowed to stand in the cold for several days, rection takes place very gradually with increase in viscosity to form a heavy somewhat reddish syrupy substance. At the end of this time the reaction mixture may be heated safely without danger. On warming the reaction mixture at this stage hydrochloric acid dissolved in the syrup is expelled and some further change takes place. The temperature may be raised gradually to over 100°, or preferably to the boiling point, 130° C., yielding a product from which the chlorine has been largely eliminated. This syrupy product although made with phenolic acid is typically non-phenolic. When freed from hydrochloric acid all the usual characteristics of carbolic acid (phenol) are lost. There is no longer the biting, corrosive action on the skin which carbolic acid exhibits; the new compound, after any free hydrochloric acid has been washed out or eliminated, being bland and neutral. In fact the raw carbolic acid material employed in its preparation has completely lost its identity and become transformed into an entirely different species of chemical compound. The two powerfully active and corrosive substances react, as it were, each to destroy the corrosive properties of the other, advantageously resulting in yielding a transformation product which in turn becomes the raw material for making resins as will be subsequently described.

A modification of the foregoing procedure is that of adding one reagent very gradually to the others. Thus the benzotrichloride may be added to a mixture of the phenolic body and alcohol, in which case gentle heating may be applied to start the reaction and the evolution of hydrochloric acid will be gradual in proportion to the rate of addition of one substance to the other. Or the phenol and alcohol may be added to the benzotrichloride.

Either of these ways will suffice to bring about a very deliberate evolution of hydrochloric acid which prevents violent foaming or any dangerous and explosive evolution of this gas. The latter may be collected in a suitable absorbing system and utilized in other ways.

The thick viscous syrupy intermediate or secondary product may be steam distilled to remove any objectionable impurity such as phenol and the residue of hydrochloric acid likewise is largely removed. This particular mode of removing the excess of phenol is not claimed in the present application. This is desirable when another acid accelerator such as sulphuric or phosphoric acid is to be used in place of hydrochloric acid.

However it is generally preferable to leave the residue of hydrochloric acid in the bland non-corrosive intermediate product as it can be used to advantage in the step about to be described. It may be noted that a product is obtained when the subsequent treatment with formaldehyde progresses in the presence of a strong mineral acid which is of a character different from that resulting from reaction in an alkaline medium.

Having thus obtained the bland syrupy product (free from or containing a small amount of hydrochloric acid) the next step is that of reacting with an aldehyde, for example, formaldehyde, to convert the syrup into a resin. A relatively small amount of formaldehyde serves to do this. In this respect it differs considerably from acetone, urea and phenol which require large amounts of formaldehyde for resinification and especially to produce bodies capable of quickly hardening on heating.

For these and other reasons I am satisfied that the reaction in question carried out in accordance with my invention produces a new substance which has properties entirely different from other well recognized resin-forming substances such as acetone, urea and phenol.

The reaction with formaldehyde may be carried out in an acid, neutral or alkaline medium. The employment of other aldehydes, in whole or in part, such as paraform, acetaldehyde, paraldehyde, butyl aldehyde, acrolein, benzaldehyde and the like is not precluded in connection with the preparation of special resinous products. Furfural likewise may be employed alone or admixed with formaldehyde in certain cases, best in an alkaline medium.

Hence there is a substantial saving in formaldehyde when preparing resins in accordance with the present invention. Toluol may be cheaply chlorinated using by-product chlorine from caustic soda manufacture. The reaction between this material and carbolic acid or cresylic acid (phenol or cresol) may be readily carried out observing the precautions set forth herein. With only 20–30 per cent of its weight of ordinary aqueous (forty per cent) solution of formaldehyde corresponding to about 10 per cent (8 to 12%) of actual formaldehyde a desirable degree of resinification is obtained. Such a resin may be incorporated with various fillers such as clay, asbestos flour and fibre, cotton flock, cotton linters, wood flour, paper etc. and if desired a few per cent of hexamethylene-tetramine added thereby obtaining a molding composition which hardens very readily when hot pressed, for example, at a temperature of 150–160° C. and a pressure of 1000 pounds per square inch.

As an illustration of my invention I give the following example but it should be understood that I do not wish to be limited to the details thereof.

1128 parts by weight of phenol and 400 parts of ethyl alcohol were mixed and heated to 90° C., and then 780 parts of chlorinated toluol (chlorinated in the side chain) were slowly added. A vigorous exothermic reaction took place with the evolution of hydrochloric acid gas. The reaction was carried out under a reflux or return condenser to prevent loss of the more volatile constituents and the hydrochloric acid was suitably absorbed. After the chlorinated toluol had been added the resulting solution was maintained in ebullition by heating for a period of 2 to 3 hours or until hydrochloric acid gas was no longer given off. The secondary product thus obtained was a dark red, thick syrup or heavy oil and contained 0.2 per cent of free hydrochloric acid. The syrupy secondary product was then reacted with 30 per cent of its weight of aqueous formaldehyde (37 to 40 per cent aqueous solution) first, however, preferably acidifying with concentrated hydrochloric acid in order to raise the acid content of the secondary product to approximately 1 per cent. The acidulated secondary product and formaldehyde solution were boiled together for a period of one hour. After the solution had been boiled for the above period the aqueous portion was separated as completely as possible and the product heated to remove the remaining moisture. The now resinous product foamed considerably on the application of heat and it was therefore necessary to heat cautiously. During the heating a volatile water-insoluble material was distilled off. The heating was continued until the temperature of the resin reached 160° C. Hydrochloric acid is usually well expelled by this treatment but as a precaution in some cases an amount of caustic soda just sufficient to neutralize the hydrochloric acid may be added before drying and the resin washed to remove salts. When cold the product is a hard, brittle, clear red resin soluble in alcohol and other ordinary organic solvents. The yield of the secondary syrupy liquid was 80 per cent of the material taken and the yield of resinous product after drying and removal of volatile matter by heating to 160° C. was 95.3 per cent of the secondary product.

45 parts by weight of the resin was dissolved in 45 parts of denatured alcohol and 4½ parts of hexamethylenetetramine was added. The alcoholic solution was then used to impregnate 55 parts of wood flour; the impregnation or mixing being carried out in a Werner-Pfleiderer mixer. The resulting composition was dried in a vacuum dryer in which the temperature was raised gradually to 100° C. The dried product on hot pressing gave a molded article which was satisfactory with respect to flow, rate of curing, surface finish and strength.

In another case in order to obtain an article black in color (the natural color of the composition being a rich brown) 1 part of nigrosine (spirit soluble) was added to the alcoholic solution before impregnation of the wood flour.

In some cases it was noticed that the composition had a slight tendency to stick to the mold and the addition of 0.5 per cent by weight of a metallic soap such as aluminum stearate, aluminum palmitate and the like prevented this occurence. The metallic soap is usually added after the wood flour has been impregnated with the resinous solution. This may be effected by dusting the soap (which has been previously screened to remove any large lumps, preferably through a 100 mesh screen) over the surface of the composition while it was being agitated in the mixer.

It was found that the concentration of the hydrochloric acid is a consideration in the manufacture of the resin. With quantities greater than 1 per cent of free hydrochloric acid present, the reaction with the formaldehyde is extremely violent and the contents of the vessel in which the reaction is taking place sometimes are ejected. On the other hand concentrations of less than 0.5 per cent free hydrochloric acid unduly prolonged the time required for the reaction to take place and in one case where but 0.2 per cent of hydrochloric acid was present the time required to carry out the reaction with the formaldehyde was four times that necessary when 1 per cent of the acid was present. Other accelerators of reaction such as sulphuric acid may be used in lieu of hydrochloric acid. Alkaline substances are not as suitable as the resin is prone to be relatively weak. The distillate obtained upon heating the resinous product to remove the last traces of water and also to remove the volatile matter present upon redistillation was found to boil between 75 and 110° C. Upon fractionation a small quantity of ethyl alcohol was recovered but the major portion of the distillate was not ethyl alcohol as it was but partially soluble in or miscible with cold water and had a boiling point ranging from 80–90° C.

Distillation of the syrupy secondary product, (from ethyl alcohol, phenol and benzotrichloride) yielded distillates having the following boiling point range in one case.

|  | Per cent |
|---|---|
| Boiling between 82–162° C | 8.6 |
| Boiling between 106–171° C | 4.1 |
| Boiling between 171–183° C | 4 |
| Boiling between 183–186° C | 15.5 |
| Boiling between 186–191° C | 20.1 |
| Boiling between 191–196° C | 9 |
| Boiling between 196–201° C | 15 |
| Boiling between 201–261° C | 4.5 |
| Residue | 19.7 |

As another example of preparation of the resinous product 564 parts by weight of phenol, 175 parts ethyl alcohol was mixed, heated to 80° C and 390 parts of chlorinated toluol (chlorinated in the side chain) having a specific gravity of 1.290 was slowly added. After the first vigorous exothermic reaction with evolution of hydrochloric acid gas the solution was boiled under a return condenser for 2 hours. At the end of this time hydrochloric acid gas was no longer given off and the yield of this secondary product was 945 parts by weight. 10 parts by weight of concentrated hydrochloric acid were then added to this product and the solution heated to 80° C. 310 parts of aqueous formaldehyde (37 per cent solution) were then slowly added to the warm solution. After the formaldehyde had all been added the solution was boiled for 1 hour under a return condenser, allowed to cool and the aqueous layer removed as much as possible. The resulting resinous product was heated to 160° C. to remove the remaining water and also the volatile material present. The yield of resin after this treatment was 850 parts. The resulting resin was removed from the reaction vessel while hot and poured into pans to cool. When cold the brittle, clear, transparent red resin was ground and mixed as follows: 45 parts of the resin, 4½ parts hexamethylenetetramine, 1 part stearic acid, 3½ parts zinc oxide, 2 parts nigrosine, 43.5 parts wood flour. The materials were roughly mixed in a ball or pebble mill and the mixture then milled on a pair of heated rolls. Differential rolls such as are used in milling rubber may be used. The material sheeted well and the resulting sheets when cold were ground and the ground composition or "molding powder" tested by molding in the hot press. The above composition was found to be satisfactory for molding giving a hard molded article of good strength and appearance, high finish and in every respect being suitable for the purpose for which it was intended. Milling the filler with the resin avoids the expense of a solvent for impregnation and its recovery. Sheeting and grinding afford a composition advantageously less bulky than that derived by impregnation.

In the foregoing examples ethyl alcohol has been specified. Other alcohols such as isopropyl, butyl, etc., are also suitable for use in the present invention and yield satisfactory products. From a standpoint of cost however ethyl alcohol in the form of ordinary denatured alcohol is to be preferred. Furthermore the by-products obtained during the removal of the volatile material from the resinous intermediate product after treatment with aqueous formaldehyde are influenced by the alcohol used but this phase of the invention will be treated in a separate patent application.

When I refer to a bland neutral substance from carbolic acid and benzotrichloride it is understood that hydrochloric acid is evolved by the reaction and may be present and that the term bland neutral product describes such material if and when the hydrochloric acid is removed. Since I prefer to retain some hydrochloric acid in this product for its effect during the subsequent treatment with formaldehyde I do not wish to have any misconstruction put on the use of this term. It is an expression employed to clearly indicate the novel character of the product irrespective of the presence or absence of hydrochloric acid. Carbolic acid is inherently a strongly-corrosive body while the new transformation product or secondary product as I have termed it is inherently non-corrosive. From this standpoint the temporary presence of a strong acid such as hydrochloric acid is immaterial.

Generally speaking I prefer to carry out the reaction with the benzotrichloride or the xylol chloride etc. in such a manner to completely eliminate any impurity such as carbolic acid or else to substantially purify by steam distillation etc. to remove any material impurity of carbolic acid. However the presence of immaterial amount of carbolic acid even though perhaps sufficient to give a blue coloration when tested with the sensitive ferric chloride test are not precluded. In fact I do not wish my invention to be avoided by claims to the effect that the presence of an inconsequential percentage of phenol or cresol has been used by those making such claim. Nor do I wish my invention to be avoided by the addition of other resins or other substances of dissimilar character such as rosin, shellac, copal, acetone formaldehyde resin, urea formaldehyde resin or phenol formaldehyde resin etc.

The preferred steps may now be set forth as follows: (1) Destroying the identity (corrosive character) of carbolic acid (phenol or cresol) by the action of powerful chloride such as benzotrichloride to form a bland soft oily syrupy or ointment-like mass usually containing some dyestuff material. (2) Converting this bland intermediate secondary or transformation product as it may be termed, into a resin by treatment with formaldehyde or its polymers preferably in the presence of an acid and particularly a strong mineral acid. The following step may also be included, if desired: (3) Incorporating with a filler to make molding composition or impregnating paper, cloth and the like to form laminated pressboard etc.; a substance such as hexamethylenetetramine being added if desired. Further there may be employed instead of impregnation, incorporation of the resin with filler by grinding and sheeting on hot rolls and employing the sheeted material for molding purposes or crushing and regrinding to make a molding powder.

In the appended claims, the term "phenol" is intended to indicate $C_6H_5OH$, and the term "a phenol" is intended to embrace this substance and its homologues (e. g. cresol) and related bodies.

What I claim is:—

1. The process which comprises transforming carbolic acid into a syrupy viscous product which is substantially devoid of the corrosive properties of carbolic acid, but capable of resinification, reacting on said syrupy viscous product in an acid medium with formaldehyde to form a resin, incorporating the resin with a small percentage of hexamethylenetetramine.

2. The process which comprises transforming a corrosive phenol into a syrupy viscous product having substantially non-corrosive properties but capable of resinification, reacting on said syrupy viscous product in an acid medium with aqueous formaldehyde to form a resin and incorporating hexamethylenetetramine with the latter.

3. The process which comprises reacting on carbolic acid with side-chain-chlorinated toluol whereby a soft material having substantially non-corrosive properties is obtained, reacting on the latter in acid medium with aqueous formaldehyde to form a resin, removing water and acid and incorporating a small percentage of hexamethylenetetramine with the dried resin.

4. In the process of making resin the steps of forming an intermediate product which comprises reacting on carbolic acid with benzotrichloride to substantially convert the carbolic acid to a bland, neutral product with the evolution of hydrochloric acid and reacting upon such bland neutral product with formaldehyde to form a resin.

5. In the process of making synthetic resin the steps which comprise reacting with side-chain-chlorinated toluol containing benzotrichloride on a single ring phenolic body in such proportions as to form a non-corrosive bland syrupy product and reacting upon the latter with about 8 to 12% of its weight of formaldehyde.

6. In the process of making synthetic resins the step which comprises reacting on carbolic acid one mol. with benzotrichloride approximately three mols. to eliminate chlorine as hydrochloric acid and to form a non-corrosive bland syrupy product serving as the raw material and reacting thereupon with an aldehyde to form a resin.

7. In the process of making molding composition the steps which comprise reacting with formaldehyde in acid solution on the bland transformation product of reaction of benzotrichloride on carbolic acid, incorporating the product resulting from the formaldehyde step with hexamethylenetetramine.

8. In the process of making molding composition the steps which comprise reacting with formaldehyde in acid solution on the bland transformation product of reaction of benzotrichloride on carbolic acid, incorporating the product resulting from the formaldehyde step with hexamethylenetetramine.

9. In the process of making molding composition the steps which comprise reacting with formaldehyde in the presence of hydrochloric acid on the bland transformation product of reaction of benzotrichloride on carbolic acid, incorporating the product resulting from the formaldehyde step with hexamethylenetetramine.

10. The process which comprises reacting on carbolic acid with benzotrichloride in the presence of an alcohol and treating the resulting product with formaldehyde in the presence of hydrochloric acid whereby a resin is formed.

11. A resin formed by combining an aldehyde with the bland products of reaction of one mol. of benzotrichloride on three mols. of phenol.

12. A resin formed by combining formaldehyde with the bland products of reaction of one mol. of benzotrichloride on three mols. of phenol.

13. The products of reaction of approximately one mol. side-chain-chlorinated toluol on three mols. of a single ring phenolic body combined with an aldehyde.

14. The process which comprises reacting on carbolic acid with benzotrichloride in the presence of an alcohol and treating the resulting product with formaldehyde in the presence of an accelerator whereby a resin is formed.

15. A resin formed by combining an aldehyde with the bland products of reaction of one mol. of benzotrichloride on three mols. of a simple single ring phenol.

16. A process which comprises reacting upon a phenol with side-chain-chlorinated toluol, to form a substantially non-corrosive dyestuff-containing material, and reacting upon the latter with a small amount of formaldehyde.

17. A process which comprises reacting upon a phenol with benzotrichloride to form a substantially non-corrosive dyestuff-containing material, and reacting upon the latter with a small amount of formaldehyde.

18. A resin formed by combining an aldehyde with the bland products of reaction of one mol. of benzotrichloride on three mols. of a phenol.

19. The process which comprises transforming carbolic acid into a syrupy viscous product substantially free from the corrosive properties of carbolic acid, and having a reddish color, reacting on said syrupy viscous product in acid medium with formaldehyde to form a resin and incorporating hexamethlenetetramine with the latter and thereafter heating sufficiently to cause the hexamethylenetetramine to react with the resin.

20. The process which comprises transforming carbolic acid into a syrupy viscous product substantially free from the corrosive properties of carbolic acid, and having a reddish color, by reacting on said carbolic acid with a side-chain-chlorinated-toluol in which benzotrichloride predominates, reacting on said syrupy viscous product in acid medium with formaldehyde to form a resin and incorporating hexamethylenetetramine with the latter and thereafter heating sufficiently to cause the hexamethylenetetramine to react with the resin.

21. The process which comprises transforming carbolic acid into a syrupy resinous product which is substantially devoid of the corrosive properties of carbolic acid, but capable of resinification, by reacting on said carbolic acid with a side-chain-chlorinated-toluol in which benzotrichloride predominates, reacting on said syrupy viscous product in an acid medium with formaldehyde to form a resin, incorporating the resin with a small percentage of hexamethylenetetramine.

22. The process which comprises transforming a corrosive phenol into a syrupy viscous product having substantially non-corrosive properties but capable of resinification, by reacting on said phenol with benzotrichloride, reacting on said syrupy viscous product in an acid medium with aqueous formaldehyde to form a resin and incorporating hexamethylenetetramine with the latter.

CARLETON ELLIS.